United States Patent
Lee et al.

(10) Patent No.: US 12,555,495 B2
(45) Date of Patent: Feb. 17, 2026

(54) 3D PHYSICAL REPLICA OF A CARDIAC STRUCTURE AND A METHOD FOR MANUFACTURING THE SAME

(71) Applicant: The Chinese University of Hong Kong, Hong Kong (CN)

(72) Inventors: Pui Wai Lee, Hong Kong (CN); Ka Wai Kwok, Hong Kong (CN); Kwok Leung Chan, Hong Kong (CN)

(73) Assignee: The Chinese University of Hong Kong, Hong Kong (CN)

( * ) Notice: Subject to any disclaimer, the term of this patent is extended or adjusted under 35 U.S.C. 154(b) by 1099 days.

(21) Appl. No.: 17/476,783

(22) Filed: Sep. 16, 2021

(65) Prior Publication Data
US 2022/0084440 A1    Mar. 17, 2022

Related U.S. Application Data

(60) Provisional application No. 63/079,592, filed on Sep. 17, 2020.

(51) Int. Cl.
| | |
|---|---|
| *G09B 23/30* | (2006.01) |
| *A61B 34/10* | (2016.01) |
| *B33Y 50/00* | (2015.01) |
| *B33Y 80/00* | (2015.01) |

(52) U.S. Cl.
CPC .............. *G09B 23/30* (2013.01); *A61B 34/10* (2016.02); *B33Y 50/00* (2014.12); *B33Y 80/00* (2014.12); *A61B 2034/105* (2016.02); *A61B 2562/0247* (2013.01)

(58) Field of Classification Search
CPC ........... A61B 2017/00526; A61B 2017/00707; A61B 2017/00716; A61B 2034/105;
(Continued)

(56) References Cited

U.S. PATENT DOCUMENTS

| | | | |
|---|---|---|---|
| 11,607,316 B2 | 3/2023 | Vogtmeier | |
| 2005/0249392 A1* | 11/2005 | Allain | G06T 7/155 |
| | | | 382/128 |

(Continued)

FOREIGN PATENT DOCUMENTS

| | | |
|---|---|---|
| CN | 101996512 A | 3/2011 |
| CN | 108697373 A | 10/2018 |

(Continued)

OTHER PUBLICATIONS

Thielen, M. W. H., Delbressine, F. L. M., Bambang Oetomo, S., & Feijs, L. M. G. (2019). Anatomically Realistic Neonatal Heart Model for Use in Neonatal Patient Simulators. Journal of Visualized Experiments (JoVE), (144), Article e56710. https://doi.org/10.3791/56710 (Year: 2019).*

(Continued)

*Primary Examiner* — Xuan M Thai
*Assistant Examiner* — Zachary Joseph Pollock
(74) *Attorney, Agent, or Firm* — Fish & Richardson P.C.

(57) ABSTRACT

Disclosed is a 3D physical replica of a cardiac structure or a vascular structure and a method for manufacturing the same. According to an embodiment, a method for manufacturing a 3D physical replica of a cardiac structure comprises: printing an inner mold according to a 3D model of the cardiac structure; casting a biomimetic material on an outer surface of the inner mold; and solidifying the casted material to form the 3D physical replica of the cardiac structure, wherein the solidified material is stretchable.

12 Claims, 3 Drawing Sheets

(58) Field of Classification Search
CPC ............ A61B 2562/0247; A61B 34/10; A61B
2017/3429; A61B 2090/367; A61B 5/00;
A61B 8/00; A61B 8/0883; A61F 2/24;
A61F 2240/001; B33Y 10/00; B33Y
50/00; B33Y 80/00; G09B 23/30; G09B
23/00; G09B 23/28; A61L 27/00; B22F
5/00; B28B 1/00; B29B 11/00; B29C
33/64; B29C 64/00; B32B 17/10798;
B32B 25/20; D03D 3/02; G05B
2219/35145; G05B 2219/40442; G06T
17/00; G06T 2207/30048; G06T
2207/30101; G06T 2207/30104; G06V
40/14; H01L 33/56; Y10S 623/00; C12N
5/0691
USPC ........................................................ 434/272
See application file for complete search history.

(56) References Cited

U.S. PATENT DOCUMENTS

| | | |
|---|---|---|
| 2007/0282202 A1 | 12/2007 | Maurice et al. |
| 2010/0196322 A1 | 8/2010 | Migneco et al. |
| 2014/0069215 A1 | 3/2014 | Tavakoli et al. |
| 2015/0250934 A1* | 9/2015 | Min .................... A61M 60/427 |
| | | 700/119 |

FOREIGN PATENT DOCUMENTS

| | | |
|---|---|---|
| CN | 110328793 A | 10/2019 |
| CN | 111227930 A | 6/2020 |

OTHER PUBLICATIONS

Hu et al., "Three-dimensional printing technology: new method for understanding congenital heart disease," Chinese Journal of Medical Physics, Feb. 2016, 33(2):173-176 (English Abstract).
Office Action in Chinese Appln. No. 202111030967.0, mailed on Jan. 23, 2025, 19 pages (with English Translation).
Office Action in Chinese Appln. No. 202111030967.0, dated Apr. 14, 2025, 15 pages (with English Translation).
Office Action in Chinese Appln. No. 202111030967.0, dated Jun. 25, 2025, 16 pages (with English Translation).
Zheng, "Digital Image Processing Technology and Applications," Beijing: China Machine Press, Nov. 2015, 17 pages (with English Translation).

* cited by examiner

3D PHYSICAL REPLICA OF A CARDIAC STRUCTURE AND A METHOD FOR MANUFACTURING THE SAME

CROSS-REFERENCE TO RELATED APPLICATION

This application claims priority to U.S. Provisional Application 63/079,592, filed on Sep. 17, 2020, the content of which is incorporated herein by reference in its entirety.

TECHNICAL FIELD

The disclosure relates to a 3D physical replica of a cardiac structure and a method for manufacturing the same.

BACKGROUND

Heart disease is the leading cause of death globally. Structural heart disease refers to a group of disease processes that causes structural abnormalities of the heart or blood vessels. Structural heart diseases are treatable by open heart surgery and catheter-based therapy using percutaneous devices (stents, occluders, etc.). For both surgery and catheter-based intervention, procedural success requires careful planning and understanding of the anatomy of the target cardiac structures. Such purpose is currently achieved by using imaging techniques such as CT, MRI and echocardiography. However, the morphology of cardiac structure can be very complex and varies widely among individuals. The mechanical interaction between the device and the anatomy is difficult to quantify even using advanced imaging.

While there are some commercial technologies (e.g. Materialise Inc., Belgium) for medical image-based 3D printing, they do not create physical models using biologically accurate materials nor provide quantitative information regarding mechanical device-anatomy interactions. Both features are mandatory for accurate planning of interventional procedures because clinicians performing these procedures want to know whether a particular device would fit into the cardiovascular structure of a particular patient to achieve its therapeutic purpose and whether the implanted device would cause complications such as deforming or even rupturing important cardiovascular structures. Therefore, limitations of existing method include: 1) cardiac structure segmentation is largely manual, 2) segmentation mainly apply to CT/MRI data but limited application on 3D echocardiographic data due to low signal-to-noise ratio for the cardiac walls of 3D echocardiography, 3) no quantifiable physical information of device/model interaction. The proposed method can allow us to accurately and semi-automatically outline the target anatomy on the images on 3D echocardiography (e.g. mitral valve, aortic valve, left atrial appendage, aorta, etc.).

SUMMARY

The present disclosure aims to solve at least one of the above-mentioned limitations.

According to the present disclosure, a 3D physical replica of a cardiac structure or a vascular structure and a method for manufacturing the same are disclosed. According to an embodiment, a method for manufacturing a 3D physical replica of a cardiac structure comprises: printing an inner mold according to a 3D model of the cardiac structure; casting a biomimetic material on an outer surface of the inner mold; and solidifying the casted material to form the 3D physical replica of the cardiac structure, wherein the solidified material is stretchable.

DRAWINGS

DETAILED DESCRIPTION OF EMBODIMENTS

Hereinafter, certain exemplary embodiments will now be explained in detail with reference to the accompanying drawings. Advantages and features of the present disclosure and a method for achieving thereof will be apparent with reference to the embodiments described below in detail with the accompanying drawings. However, the disclosure is not limited to the embodiments disclosed below, but may be implemented in various different forms, and the embodiments may only make the present disclosure complete and are provided to fully convey the scope of the application to those skilled in the art in the technical field where the disclosure belongs to, and the disclosure is defined only by the scope of the claims. The same reference numbers refer to the same elements throughout the specification.

If there is no other definition, all terms used in the present specification (including technical and scientific terms) may be used in a sense that can be commonly understood by those skilled in the art. In addition, terms that are defined in commonly used dictionaries are not ideally or excessively interpreted unless they are specifically and clearly defined. The terms used herein is to describe embodiments and are not intended to limit the specification. In the present specification, singular forms also include plural forms unless specifically stated in the phrase. Hereinafter, some embodiments of the specification will be described with reference to the drawings.

Figure 1:
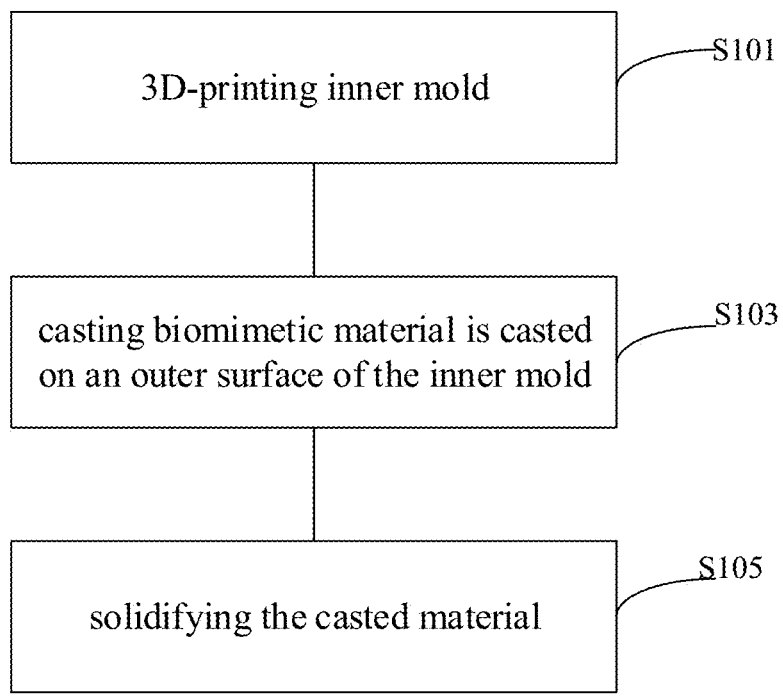
FIG. 1 illustrates a flow chart of a method for manufacturing a 3D physical replica of a cardiac structure according to an embodiment of the present disclosure.

FIG. 1 illustrate a flow chart of a method for manufacturing a 3D physical replica of a cardiac structure according to an embodiment of the present disclosure. As shown, in step S101, an inner mold is printed according to a 3D model of the cardiac structure. The 3D model of the cardiac structure may be extracted from a 3D image obtained using a 3D imaging technology including 3D echocardiography, CT, and/or MRI. In step S103, a biomimetic material is casted on an outer surface of the inner mold. Then, at step S105, the casted material is solidified to form the 3D physical replica of the cardiac structure. The solidified material is stretchable so that it can be easily removed from the inner mold.

Figure 2:
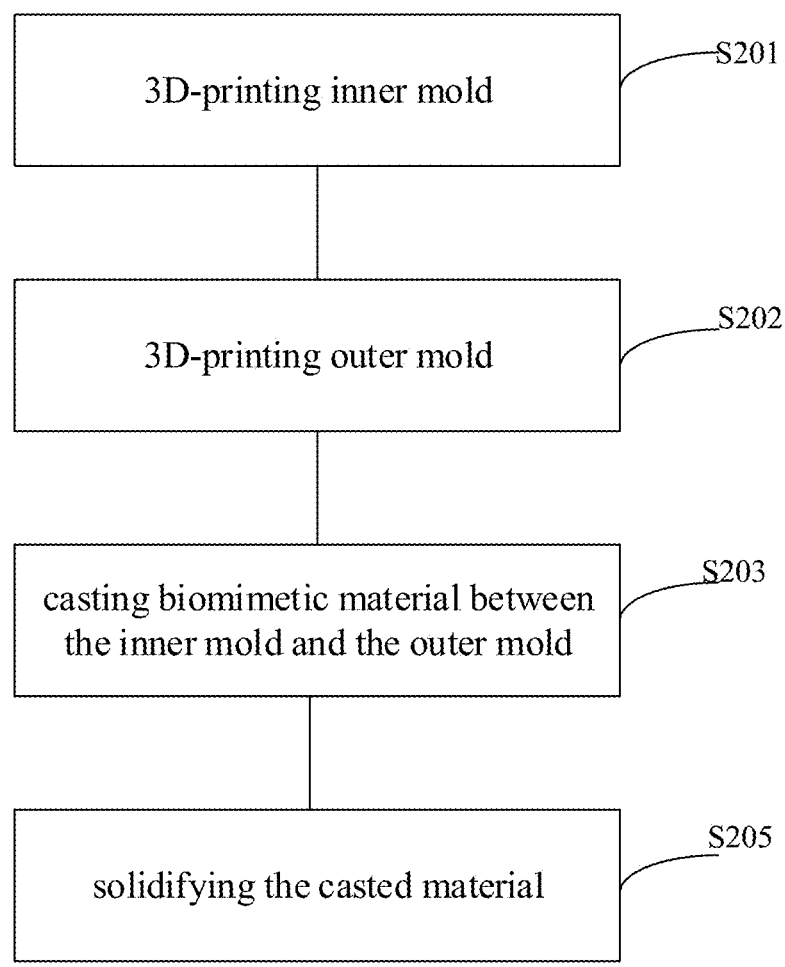
FIG. 2 illustrates a flow chart of a method for manufacturing a 3D physical replica of a cardiac structure according to another embodiment of the present disclosure.

FIG. 2 illustrate a flow chart of a method for manufacturing a 3D physical replica of a cardiac structure according to another embodiment of the present disclosure. As shown, in step S201, an inner mold is printed according to a 3D model of the cardiac structure. The 3D model of the cardiac structure may be extracted from a 3D image obtained using a 3D imaging technology including 3D echocardiography, CT, and/or MRI. In step S202, an outer mold determined by a voxel dilation of the inner mold is printed. In step S203, a biomimetic material is casted between an inner surface of the outer mold and the outer surface of the inner mold. Then, at step S205, the casted material is solidified to form the 3D physical replica of the cardiac structure. The solidified material is stretchable so that it can be easily removed from the inner mold.

According to an embodiment, the biomimetic material has stiffness and tensile strength comparable to human soft tissues. For example, the biomimetic material may be silicone material or polyvinyl alcohol (PVA) cryogel. According to an embodiment, the silicone material may be mixed with conductive materials.

In particular, as part of existing hospital protocols, cardiac patients will receive ultrasounds of the heart (echocardiograms) as part of periprocedural planning. Digital Imaging and Communications in Medicine (DICOM) images of a patient's anatomy are obtained by ultrasound. Volume rendering may be applied on the obtained images to segment the anatomical structures of interest. Image denoising and filtering are performed, for example, by using OsiriX®, a free (e.g. open source) software for image processing, by which the local intensity threshold can be automatically set to define the opacity and color of each voxel forming the volumetric model (i.e., the 3D model). By navigating the volumetric model in 3D, anatomical features irrelevant to the surgical planning/training, such as vessels, spinal and rib bone tissues, can be trimmed off intuitively, for example, by using the graphical user interface (GUI) of OsiriX®. Therefore, the researchers can focus on processing the subtle anatomic structures that are essential for surgical planning. Image processing and 3-D printing parameters are optimized to ensure the quality of each anatomical model delivered to the clinical fellows.

Once the cardiovascular structure of interest is defined, its inner surface can be extracted and exported to a mesh surface model, which contains all its vertex coordinates, the combination of vertices forming triangular faces, as well as the face normal coordinates. Such information can be saved in commonly-used mesh file formats, such as Stereolithography (STL) and Object (OBJ), which are compatibly read by many 3-D rapid prototyping machines and printers for printing the inner mold.

According to an embodiment, the mold will be 3D-printed by a high-end fused-deposition modeling (FDM) 3D printer. The phantom model (i.e., the 3D physical replica) will then be fabricated by immersing the inner mold into RTV silicone which will be degassed in a vacuum chamber at 10-15° C. As a result, a thin layer of silicone will remain on the inner mold surface, then being cured at 50° C. Polyvinyl alcohol (PVA) cryogel is an alternative material that can be used to mimic the mechanical properties of the cardiovascular tissue using repeated freeze-thaw method will be used to transform the dissolved PVA into soft, elastic cryogen for patient-specific model fabrication.

According to an embodiment, the mold may comprise an inner mold and an outer mold. FIGS. 3A-3D shows an example of front and isometric view of the inner and outer molds of a patient-specific atrium.

Figure 3A:
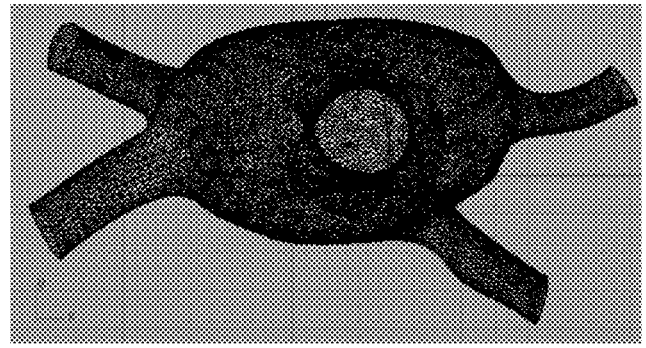
FIGS. 3A-3D illustrate front and isometric views of the inner and outer molds of a patient-specific atrium according to an embodiment of the present disclosure.
Figure 3B:
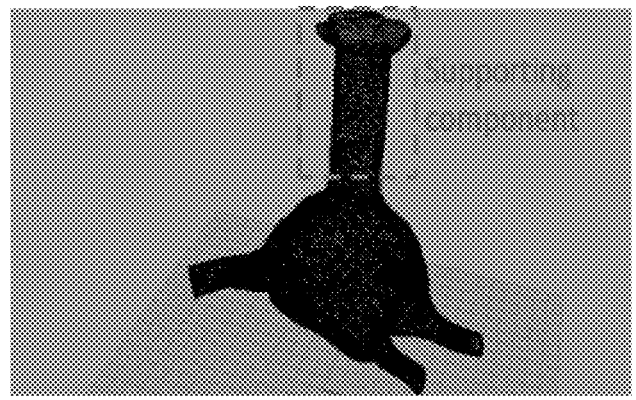
Figure 3C:
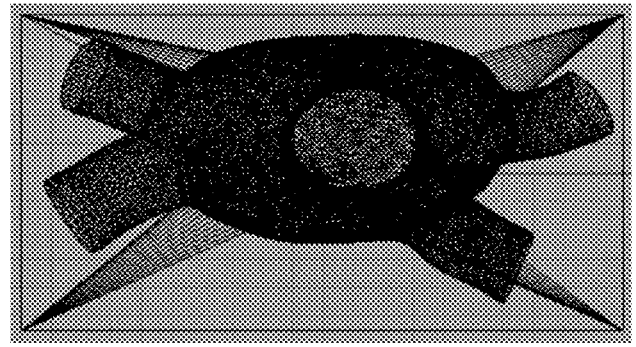
Figure 3D:
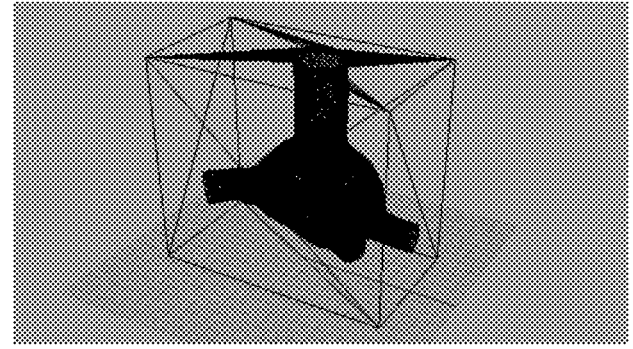

To construct a patient-specific anatomical model that provides surgeons with a detailed sense of maneuvering surgical instruments such as catheters, the model's vascular structures may be supported by extra components for ease of surgical planning/training. These components are artificially added, not just with the aim to fix the vascular structure, but also to channel the media (e.g. saline fluid), for simulation of pulsatile flow. A CAD/CAM design of the inner mold which integrates image-based anatomical model with the supporting components is shown in FIGS. 3A-B. This CAD/CAM design is used to cast the vascular structure using silicone material. Two solid molds, outer and inner molds, are required for forming a cast with a certain thickness. The CAD/CAM design acts as the inner mold in order to preserve the morphological detail of interior vascular structures. The interior surface is particularly important in simulating the sense of touch for cardiovascular intervention, since the interior vascular surface is the only tissue in contact with the surgical devices for intra-vascular interventions; therefore, the outer mold is a result of voxel dilation applied on the inner mold. FIGS. 3C-D shows the outer mold formed inside a solid rectangular block for silicone casting. Both the inner and outer molds are printed by rapid prototyping machines.

During the molding, a supporting/fixture is needed to guarantee the appropriate cavity gap in between inner and outer molds, as well as molding repeatability. An additional component that supports the structure during the silicone molding process is provided as shown in FIG. 3B. The component also acts as a fixture between the inner and outer molds. Silicone liquid can then be injected through the fixture and evenly distributed inside the cavity in between two molds. Silicone material, Ecoflex® 0030 has the appropriate flexibility to simulate proper interaction between catheters and actual cardiovascular tissue, and is therefore used in the experiment. Powdered conductive materials, such as graphite, can be mixed with the liquid-form silicone in order to maintain certain level of conductivity (at around 300-500Ω) across the wall. As a result, atrial electrograms signal will then be simulated and detected by the electrode of EP catheter. Once the silicone is fully filled inside the molding cavity, the whole setup is dried naturally under the room temperature. Note that the outer mold model may be divided into several parts for 3D printing; therefore, the silicone product can be easily removed from these separable parts, and it can also be flipped and removed from the inner mold due to the "stretchy" property of silicone itself.

According to an embodiment, the method may further comprise a step of integrating a pressure sensor in the biomimetic material. For example, during the molding or curing process, the phantom model can be integrated with miniature pressure sensors, allowing low-latency pressure measurement at high-resolution. These sensors will be integrated seamlessly inside the thin wall of the phantom model in order to monitor the regional surface pressure exerted by implantation of medical devices within the phantom model. The piezoresistive resistance sensors may be constructed by three major components, (i) the microhump structures patterned onto the silicone, (ii) carbon nanotube (CNT) or PEDOT:PSS conductive thin film laminated onto the microhumps, and (iii) thermal evaporated metal thin films. When the device is under external stress, the microhumps will be compressed and the contact area between the microhump and conductive film increases, hence the contact resistance drops. As a result, by continuously monitoring the contact resistance between the two electrodes, one can measure the real time pressure loading onto the pressure sensor. Since the device is ultra thin (less than 5 μm), they are highly conformal and able to attach to different parts of the mold.

According to an embodiment, the method may further comprise a step of extracting the 3D model of the cardiac structure from a 3D image obtained using a 3D imaging technology including 3D echocardiography, CT, and/or MRI. For example, the 3D model of the cardiac structure may be extracted by identifying the cardiac structure from the 3D image by using machine learning; and establishing the 3D model of the identified cardiac structure.

By applying machine-learning algorithm to "recognize" cardiac structures, the process can speed up. This facilitates fast prototyping of patient-specific model in a very precise manner. And then, the cardiovascular model could be fabricated or casted by the 3D printed structure. The casting materials could also be mechanically similar with the actual cardiovascular tissue. Before the real procedure, such a model will provide a very useful reference for surgical planning, eventually improving the safety, accuracy and effectiveness of the cardiovascular intervention. The proposed method will help cardiologists and researchers to better understand the patient-specific 3D anatomy of the cardiac and vascular pathology, to allow them to perform realistic procedural planning to optimize patient outcome, to create patient-specific tangible models to aid patient and medical student education.

It is understood that the method according to the present application utilizes 3D printing techniques to create patient-specific 3D cardiovascular models using biomimetic materials embedded with advanced high-resolution flexible pressure sensors to allow realistic procedural simulation. On these models, interventionists can tangibly rehearse and accurately plan structural interventions preoperatively to enhance therapeutic success for patients, shorten procedure time, and increase procedural safety. By using 3D printing technologies, cardiovascular surgeons would be provided both: (i) conventional 2-D/3-D image visualizations, in addition to a (ii) 3-D silicone anatomical models reconstructed from the patients' DICOM images. The combination of (i) and (ii) may lead to better surgical planning and treatment management for the cardiac patients. The patient-specific cardiovascular model according to the present application is created from 3D medical images using materials with physical properties comparable to soft, elastic cardiac tissues, equipped with force sensing function, in order to facilitate realistic procedural simulation and device testing. According to the present disclosure, the inner blood pool of the cardiac chambers, which has higher signal-to-noise ratio, instead of the cardiac walls having low signal-to-noise ratio, are segmented. The inner and outer molds are then printed with biomimetic material casted between them. In other words, the method according to the present disclosure does not rely on segmentation of the cardiac walls, hence applicable to 3D echocardiography.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed to have a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method for manufacturing a 3D physical replica of a cardiac structure or a vascular structure, comprising:
    identifying the cardiac structure from a 3D image by using machine learning, without segmentation of the cardiac walls;
    establishing the 3D model of the identified cardiac structure;
    printing an inner mold according to a 3D model of the cardiac structure;
    casting a biomimetic material on an outer surface of the inner mold;
    solidifying the casted material to form the 3D physical replica of the cardiac structure, wherein the solidified material is stretchable; and
    printing an outer mold, wherein the outer mold is a result of voxel dilation applied on the inner mold;
    wherein casting the biomimetic material on the outer surface of the inner mold comprises casting the biomimetic material between an inner surface of the outer mold and the outer surface of the inner mold.

2. The method according to claim 1, further comprising:
    providing an additional component between the inner mold and the outer mold for defining a channel between the inner mold and the outer mold.

3. The method according to claim 1, wherein the biomimetic material comprises silicone material or polyvinyl alcohol (PVA) cryogel.

4. The method according to claim 3, wherein the silicone material is mixed with conductive materials.

5. The method according to claim 1, further comprising:
    integrating a pressure sensor in the biomimetic material.

6. The method according to claim 1,
    wherein the 3D image is obtained using a 3D imaging technology including 3D echocardiography, CT, and/or MRI.

7. A 3D physical replica of a cardiac structure or a vascular structure, manufactured by operations comprising:
    identifying the cardiac structure from a 3D image by using machine learning, without segmentation of the cardiac walls;
    establishing the 3D model of the identified cardiac structure;
    printing an inner mold according to a 3D model of the cardiac structure;
    casting a biomimetic material on an outer surface of the inner mold; and
    solidifying the casted material to form the 3D physical replica of the cardiac structure, wherein the solidified material is stretchable; and
    printing an outer mold, wherein the outer mold is a result of voxel dilation applied on the inner mold;
    wherein casting the biomimetic material on the outer surface of the inner mold comprises casting the biomimetic material between an inner surface of the outer mold and the outer surface of the inner mold.

8. The 3D physical replica according to claim 7, wherein the operations further comprise:
    providing an additional component between the inner mold and the outer mold for defining a channel between the inner mold and the outer mold.

9. The 3D physical replica according to claim 7, wherein the biomimetic material comprises silicone material or polyvinyl alcohol (PVA) cryogel.

10. The 3D physical replica according to claim 9, wherein the silicone material is mixed with conductive materials.

11. The 3D physical replica according to claim 7, wherein the operations further comprise:

integrating a pressure sensor in the biomimetic material.

12. The 3D physical replica according to claim 7, wherein the 3D image is obtained using a 3D imaging technology including 3D echocardiography, CT, and/or MRI.

\* \* \* \* \*